(12) United States Patent
Dent

(10) Patent No.: US 8,988,186 B1
(45) Date of Patent: Mar. 24, 2015

(54) SELF-SERVICE DEVICE USER ASSET CONDITION ALERT

(75) Inventor: Nathan Dent, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1119 days.

(21) Appl. No.: 12/760,661

(22) Filed: Apr. 15, 2010

(51) Int. Cl.
*H04L 9/32* (2006.01)

(52) U.S. Cl.
USPC ............ 340/5.32; 340/5.3; 340/5.33; 705/16; 705/43; 235/375; 235/379; 235/436

(58) Field of Classification Search
CPC ....... E05B 39/00; E05B 49/004; G06F 13/22; G06K 7/00; G06K 7/0008; G06Q 20/1085
USPC ........................ 340/5.32, 5.3, 5.33, 51.1, 570; 340/815.4–815.92; 235/375, 379, 380, 436; 705/43, 16; 726/7; 348/150
See application file for complete search history.

(56) References Cited

U.S. PATENT DOCUMENTS

| | | | |
|---|---|---|---|
| 6,508,397 B1 | 1/2003 | Do | |
| 6,583,813 B1 | 6/2003 | Enright et al. | |
| 7,183,915 B2 * | 2/2007 | Bartholf et al. | ............... 340/570 |
| 7,552,467 B2 | 6/2009 | Lindsay | |
| 7,942,313 B1 | 5/2011 | Grimm et al. | |
| 7,995,791 B2 | 8/2011 | Flook et al. | |
| 8,186,578 B1 | 5/2012 | Block et al. | |
| 2003/0226888 A1 * | 12/2003 | Wiggins | ......................... 235/375 |
| 2005/0205675 A1 * | 9/2005 | Savage | ............................ 235/436 |
| 2006/0028341 A1 * | 2/2006 | Bartholf et al. | ............... 340/570 |
| 2006/0089908 A1 * | 4/2006 | Keohane et al. | ................ 705/43 |
| 2006/0169764 A1 * | 8/2006 | Ross et al. | ..................... 235/375 |
| 2007/0106558 A1 * | 5/2007 | Mitchell et al. | ................. 705/16 |
| 2007/0132836 A1 | 6/2007 | Katz | |
| 2007/0198432 A1 * | 8/2007 | Pitroda et al. | ................... 705/64 |
| 2007/0250920 A1 * | 10/2007 | Lindsay | ........................... 726/7 |
| 2008/0074496 A1 * | 3/2008 | Venetianer et al. | ........... 348/150 |
| 2009/0201372 A1 | 8/2009 | O'Doherty et al. | |
| 2011/0102588 A1 | 5/2011 | Trundle et al. | |

* cited by examiner

*Primary Examiner* — Vernal Brown
*Assistant Examiner* — Sisay Yacob
(74) *Attorney, Agent, or Firm* — Weiss & Arons LLP; Michael A. Springs, Esq.

(57) ABSTRACT

A method for operating an electronic self-service device is provided. A central computing system according to the invention may include a receiver module configured to receive an input from a self-service device. The input may include information corresponding to a user account authorization notification. The central computing system may also include a processor module configured to determine whether a predetermined asset alert condition exists that corresponds to the account. The central computing system may also include a transmitter module. When the predetermined asset alert condition is determined to exist, the transmitter module may be configured to transmit an alert notification to the self-service device. When the predetermined asset alert condition does not exist, the transmitter module may be configured to authorize use of an account in response to the authorization notification.

24 Claims, 11 Drawing Sheets

SELF-SERVICE DEVICE USER ASSET CONDITION ALERT

FIELD OF TECHNOLOGY

Aspects of the disclosure relate to providing apparatus and methods for improving self-service devices such as Automatic Teller Machines ("ATMs"), cash recyclers, and self-service kiosks.

BACKGROUND OF THE INVENTION

Self-service devices such as Automatic Teller Machines ("ATMs"), cash recyclers, and self-service kiosks are typically operated by a user in a two-step method. First, the user inserts a banking card, transaction card or other object (referred to collectively herein as a "bank card") that contains information identifying a user account. Then, the user enters a typically four-digit Personal Identification Number ("PIN").

The self-service device then compares the identification information on the bank card or other object to the received PIN. If the PIN corresponds to a predetermined secure code associated with the identification information, such as a PIN offset value, the user is provided access to his or her accounts.

One drawback associated with the aforementioned, substantially ubiquitous, system is that following authorization, the user may access his accounts without knowing the present state of his accounts, and/or without knowing whether conditions exist with respect to his accounts that require immediate attention.

It would be desirable, therefore, to provide apparatus and methods that allow a user to access his or her accounts while alerting the user of emergent conditions that relate to his or her accounts.

SUMMARY OF THE INVENTION

An electronic self-service device is provided. The self-service device includes a receiver module configured to receive an input. The input includes information corresponding to a user account authorization notification. The self-service device may also include a transmitter module configured to transmit user account authorization notification to a central computing system and a receiver module that may be configured to receive authorization notification from the central computing system. The self-service device may also include a processor module. When a predetermined asset alert condition exists, the transmitter module may be configured to transmit an asset alert condition notification. When the predetermined asset alert condition does not exist, the processor module may be configured to authorize use of an account in response to the authorization notification.

Another embodiment of an electronic self-service device may also be provided. This embodiment of an electronic self-service device may include a receiver module configured to receive an input from at least one motion detector. The input may include information corresponding to a security alert condition. The device may also include a security alert mitigation module. The device may also include a processor module configured to determine whether the information exceeds a security alert condition threshold. When the information exceeds a predetermined security alert condition threshold, the processor module may be further configured to respond to the security alert condition using the security alert condition mitigation module.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
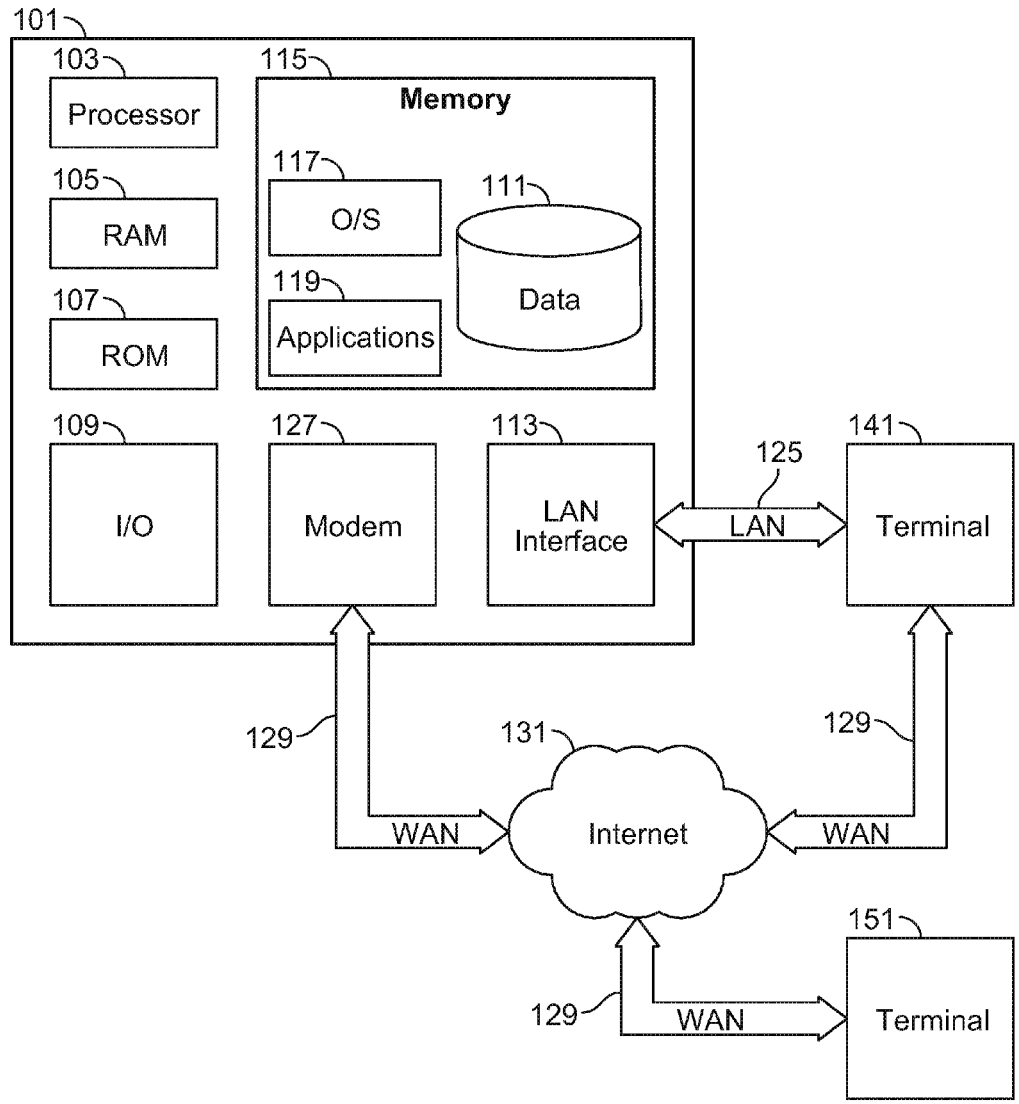
FIG. 1 shows apparatus that may be used in accordance with the principles of the invention.

Apparatus and methods for enhancing user account awareness when using self-service devices such as Automatic Teller Machines ("ATMs"), cash recyclers, and self-service kiosks are provided. User account awareness may include awareness of emergent conditions relating to one or more user accounts.

An ATM for use with apparatus and methods according to the invention may be made up of one or more of the following devices or other suitable devices: a CPU (which may control user interface mechanisms, transaction devices, and communication with a central server), a magnetic card reader (to identify the card being used), a PIN pad, a cryptoprocessor, a display, function keys (usually in close proximity to the display) and/or a touchscreen, a printer (to provide a transaction record to a customer), a vault (to store portions of the machinery requiring restricted access), and a housing.

In certain ATMs, a smart card reader (that reads a chip instead of a magnetic strip) and bill validation technology may also be implemented. A further feature of an ATM for use with systems and methods according to the invention may include printing each transaction to a roll paper journal that is stored inside the ATM.

The apparatus and methods may be scalable, for example, to cover all or a portion of the fleet of ATMs that run on a platform such as that available under the trademark APTRA platform, which is available from the NCR Corporation, Dayton, Ohio.

A conventional ATM preferably utilizes the following steps, as generally described above, in order to provide account access and/or funds to a user. First, the user inserts a banking card, transaction card or other object (referred to collectively herein as a "bank card") that contains information identifying a user account. Then, the user enters a typically four-digit Personal Identification Number ("PIN"). Following the input of the PIN, the ATM typically checks the validity of the PIN against a PIN offset value stored on the bank card.

If the PIN corresponds to the PIN offset value, the ATM typically sends a message to a main frame computer, central server or other suitable computer. The message indicates that the holder of the bank card is authorized to access his or her accounts. This message is typically sent via one or more software and/or hardware implemented communication mechanisms.

Upon receipt of the message that the user is authorized to access his or her accounts, the main frame computer, central server or other suitable computer sends account information to the ATM and the user may begin to perform account transactions.

Upon receiving account information at the ATM, it is common for the ATM to provide a menu of various selections for the user to choose. One of the exemplary selections may be a "Fast Cash" selection where, upon selection, the user is provided a number of cash amounts that the user can elect to withdraw. Such a menu typically does not provide an account balance or any other account information.

Following receipt of a user selection of the cash amount that he or she wishes to withdraw, the ATM may provide the requested cash and the user may take the cash. Thereafter, the user may depart from the ATM with or without a printed receipt. Even if the user takes the printed receipt, the receipt may or may not include a statement of the user account balance. Accordingly, such a Fast Cash option, or any other similar option, may not alert the user to any user asset condition.

Systems and methods according to the invention preferably monitor such transactions and, where appropriate, either as determined based on a system-set threshold determination or based on a user-defined threshold determination, alert a user to a user asset condition.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 121. Alternatively, some or all of server 101 computer executable instructions may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication.

Computing device 101 and/or terminals 141 or 151 may also be mobile terminals including various other components, such as a battery, speaker, and antennas (not shown).

Terminal 151 and/or terminal 141 may be portable devices such as a laptop, cell phone, Blackberry™, or any other suitable device for storing, transmitting and/or transporting relevant information.

Any information described above in connection with database 121, and any other suitable information, may be stored in memory 125.

One or more of applications 119 may include one or more algorithms that may be used to receive PINs, alert users regarding asset conditions and/or any other suitable tasks related to self-service device asset condition alert implementation.

In addition, applications 119 may also provide security alert conditions that relate to the ATM the user is operating and/or security alert conditions that pertain to the user account. Informing the user regarding security alert conditions that pertain to the user account may provide the user a substantial benefit at least in preventing further fraud regarding the user's account because such information may reduce the time elapsed prior to the user discovering the fraud.

The following table sets forth a list of exemplary alert conditions:

TABLE 1

Security Alert Conditions

Proximity of a Suspicious Person
Possibility of Tampering With the ATM
Atypical Number of Users Waiting for ATM, or Atypical Behavior by Person Waiting on Line to use ATM
Recent Fraudulent Use of ATM The determination of proximity of a suspicious person that surpasses a predetermined threshold, a possibility of tampering with the ATM that surpasses a predetermined threshold, a determination of abnormality of waiting users that surpasses a predetermined threshold and a recent fraudulent use of an ATM that surpasses a predetermined threshold may all be determined by algorithms using known technologies.

Figure 11:
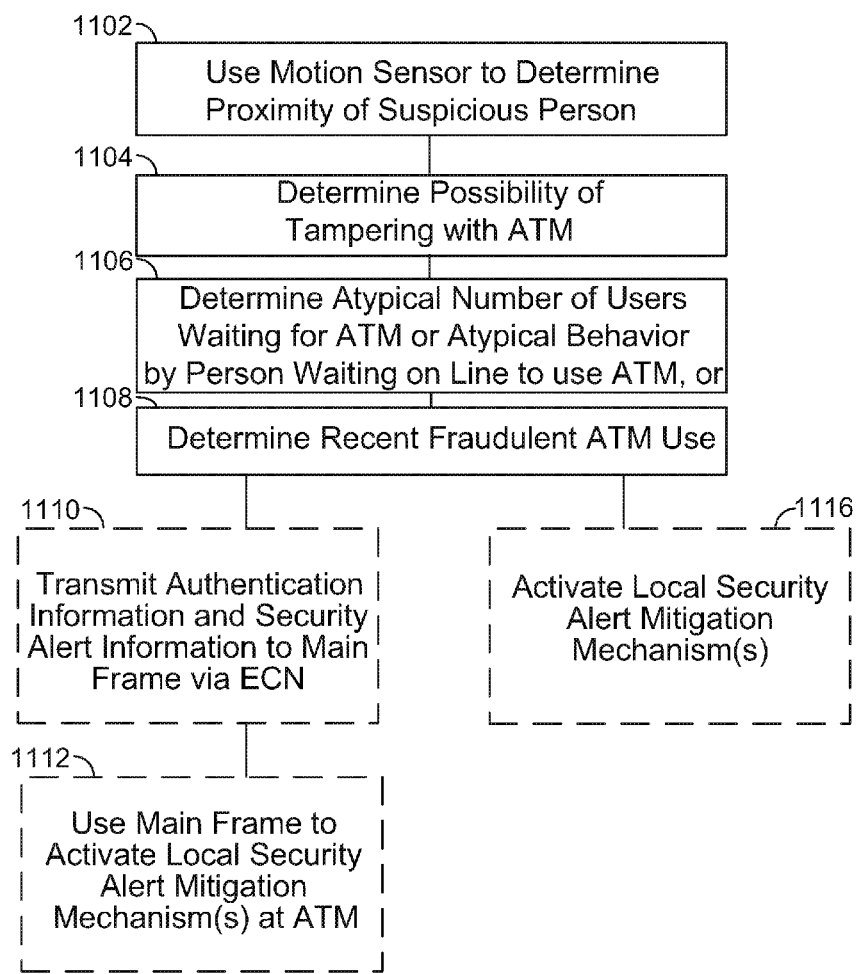
FIG. 11 shows an illustrative flow diagram that describes a method for implementing a security condition alert according to the invention.

Such known technologies may involve algorithms utilizing motion detection which may be used determination of motion and/or presence. FIG. 11 below, and the portion of the specification corresponding thereto, illustrates exemplary algorithms that may be used to determine whether security alert conditions exist.

Suitable motion sensor technology may include passive infrared sensors, active ultrasonic sensors such as Doppler shift detection sensors, audible sound detection sensors and/or microwave sensors.

Determination of tampering and/or fraudulent use of the ATM may involve known ATM monitoring technology.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
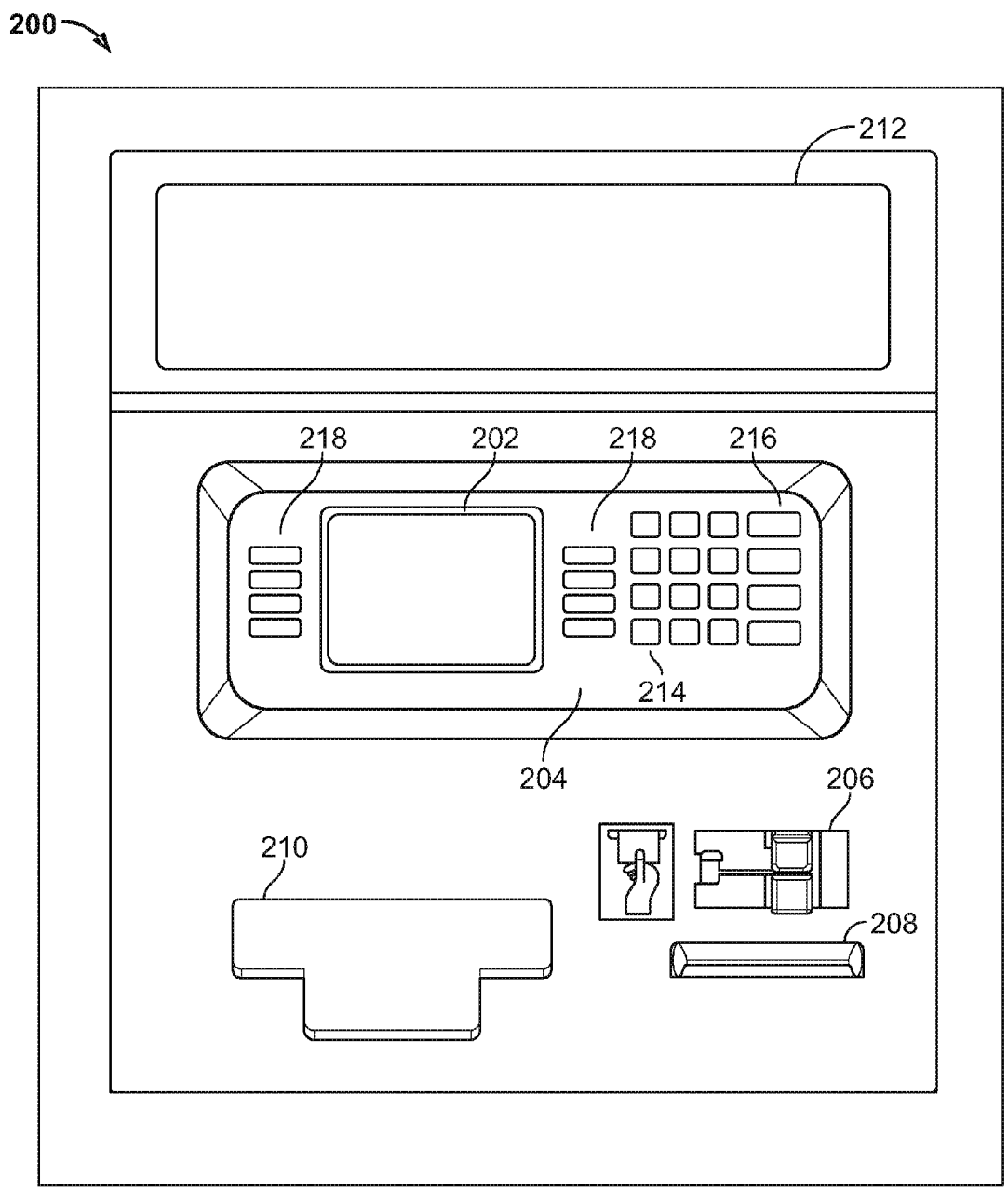
FIG. 2 shows an apparatus for use according to the principles of the invention.

FIG. 2 shows illustrative self-service device 200, which may be an ATM. Self-service device 200 may include monitor 202, keypad 204, card reader port 206, document acceptor 208, item dispenser 210 and security screen 212.

Monitor 202 may exchange visual and or audio information with a customer. Keypad 204 may include alphanumeric keys 214 for the customer to enter alpha-numerical and/or textual data. Keypad 204 may include control keys 216. In some embodiments, control keys 216 may be used to communicate control information, such as instructions, to self-service device 200. Keypad 204 may include soft keys. Soft keys 218 may have functions that are dictated by programming and are presented to the customer using information that may be displayed on monitor 202.

Card reader port 206 may be the front end of any suitable card reader. The card reader may read magnetically encoded information on transaction instruments such as bank cards. In some embodiments, self-service device 200 may include a contactless chip reader, a wireless transceiver or any other suitable interface for exchanging transaction information with a transaction instrument. The transaction instrument may be a chip, an RFID tag, a smart card, a PDA, a telephone or any other suitable device.

In some embodiments, self-service device 200 may include a biometric sensor (not shown). The biometric sensor may identify a customer based on a feature, such as an anatomical feature, of the customer. For example, the biometric sensor may be configured to identify the customer based on all or part of a face, a fingerprint, an iris, a retina, a hand or any other suitable anatomical feature. The biometric sensor may identify the customer based on a behavioral feature such as a signature, a voice, a gait or any other suitable behavioral feature.

In some embodiments of the invention, the biometric sensor may be used alone, or in combination with a PIN and/or bank card, as a user asset condition alert device. In such embodiments, the biometric sensor may act to identify a user such that asset condition alert features according to the invention may be implemented. Further, such a device may be used in combination with some or all of the other embodiments described in this application.

Document acceptor 208 may accept any suitable documents. For example, document acceptor 208 may accept envelopes, deposit forms, bills, checks or any other suitable documents. In some embodiments, document acceptor 208 may feed into a scanner that digitizes the documents for image-based transaction processing.

It should be noted that alerts according to the invention may or may not limit the ability of a user to withdraw and/or deposit documents in self-service device 200. In certain embodiments, a user asset condition alert state may limit certain types of withdrawals and/or document deposits but not others. In other embodiments, a user asset condition alert state may prevent any withdrawals and only allow deposits.

Item dispenser 210 may dispense items. For example, item dispenser 210 may dispense bills. In some embodiments of the invention, dispenser 210 may be limited to dispensing certain amounts of funds, and/or certain sizes of bills. Such limitations may be user-defined and/or system set. In other embodiments, the user asset alert conditions may set localized limits on dispensing funds, as described elsewhere in this specification.

The following table sets forth an exemplary list of alert conditions to which systems and methods according to the invention may be directed. It should be noted that the conditions listed below are exemplary and should not be considered to be an exclusive list of alert conditions according to the invention.

TABLE 2

Asset Alert Conditions

Low Balance Alert
Overdraft Alert
Possible Account Tampering Alert
Atypical Activity by One of the Account Holders TABLE 2-continued Asset Alert Conditions Combination of one or more of the
foregoing Security screen 212 may visually screen a surveillance device (not shown). The surveillance device may provide video information about individuals that are present near the self-service device and the security conditions there.

Such security conditions may trigger a security condition alert that alerts an ATM user according to the invention. Such a security condition alert may be communicated to the user by any one or more of the mechanisms listed in the following table.

TABLE 3

Security Alert Mechanisms

Figure 3:
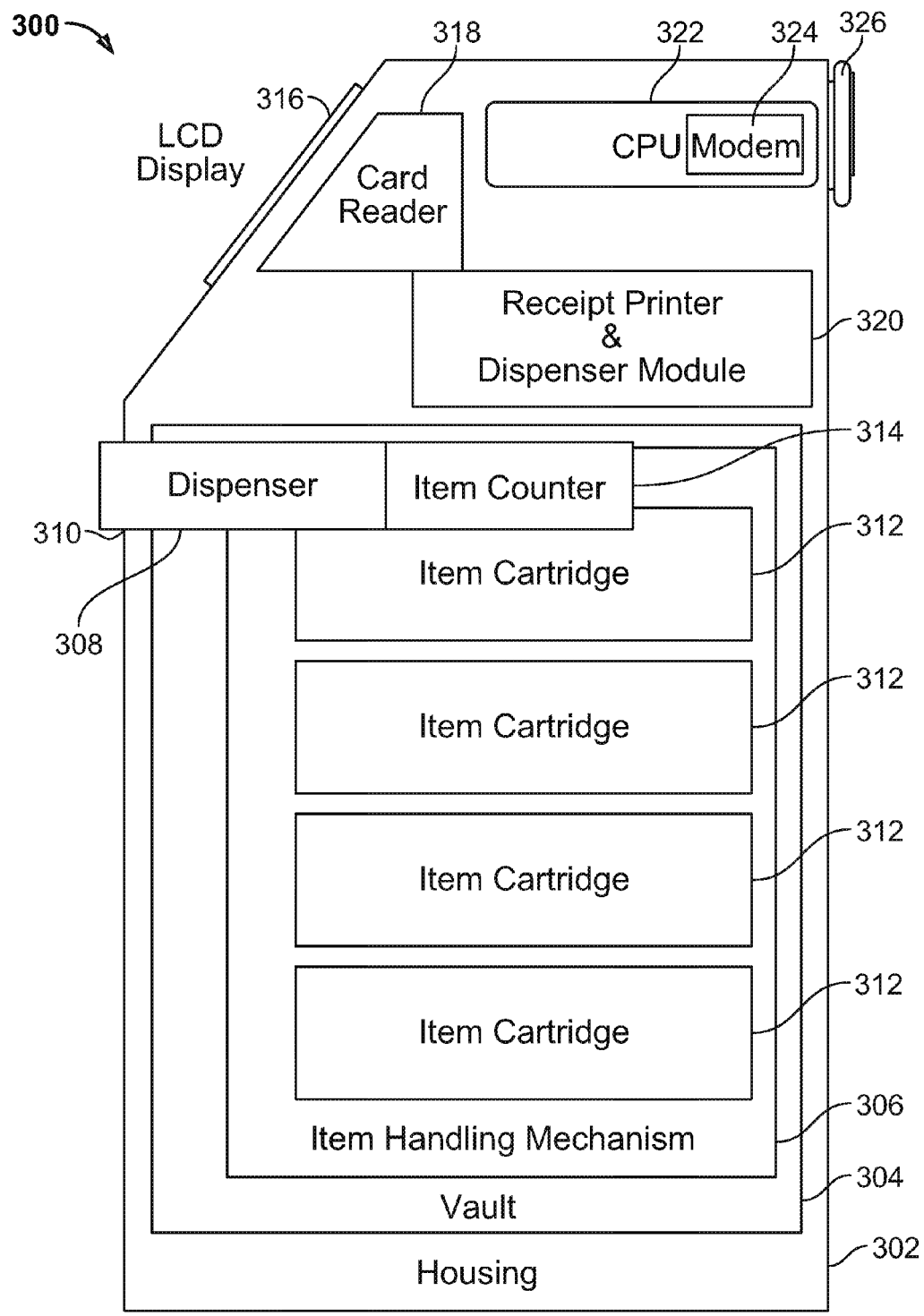
FIG. 3 shows a schematic diagram of another apparatus for use according to the principles of the invention.

Visible Warning of Security Alert
Condition, Wherein the Visible Warning
is Displayed on the ATM display
Printed Warning via ATM Printer
Audio Warning via ATM Speaker System
Tactile Feedback via Internal Tactile
Response Mechanism within ATM
Combination of one or more of the
foregoing FIG. 3 shows illustrative self-service device 300. Self-service device 300 may have one or more of the features of self-service device 200 (shown in FIG. 2). Self-service device 300 may include housing 302. Self-service device 300 may include vault 304. Vault 304 may contain items (not shown). Item handling mechanism 306 may be present in vault 304. Item handling mechanism 306 may store, arrange, dispense and/or otherwise handle items for dispensing from self-service device 200. For example, item handling mechanism 306 may include conveyors (not shown) for positioning and repositioning items for dispensing by dispenser 308 through item port 310. Items (not shown) in item handling mechanism 306 may be contained in item cartridges 312. For example, when the items are bills, item cartridges 312 may be cash cartridges.

Item handling mechanism 306 may include item counter 314. Item counter 314 may count items prior to dispensing by dispenser 308.

Self-service device 300 may include LCD display 316 and a keypad (not shown) for customer interaction. Card reader 318 may be present for receiving transaction information from the customer via a suitable transaction instrument. Self-service device 300 may include receipt printer and dispenser module 320. Receipt printer and dispenser module 320 may provide the customer with a record of a transaction. CPU 322 may control customer I/O, dispensing processes, which may include initialization, actuation, dispensing and any other suitable processes, receipt printing and dispensing, transaction channel communications, user asset condition alerts, security alerts and any other suitable processes. The transaction channel communications may be performed using modem 324, which may be any suitable communication device. Modem 324 may communicate with a local or regional network router (not shown). Service monitor 326 may be provided for a service technician to exchange information and instructions with CPU 322.

Figure 4:
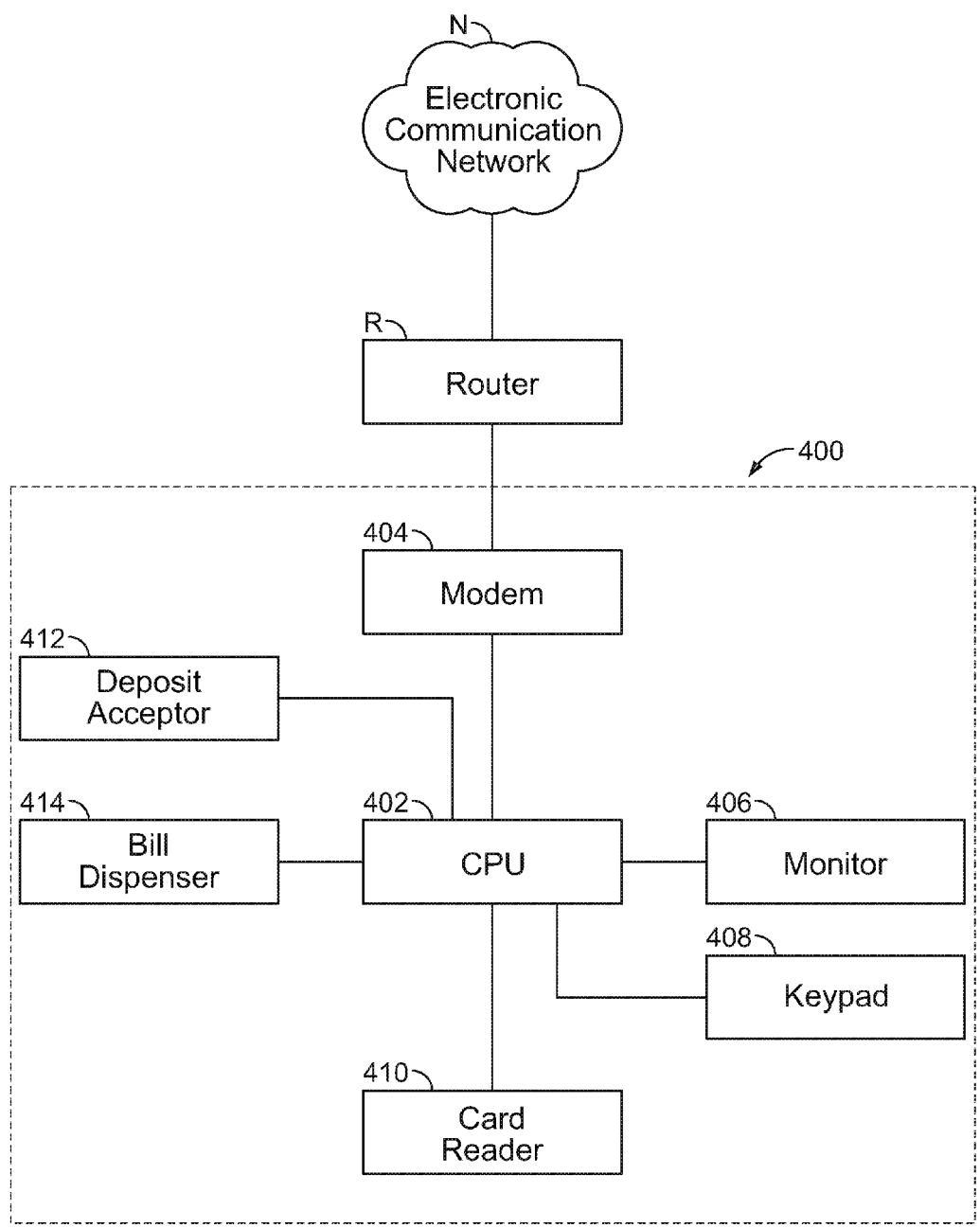
FIG. 4 shows a schematic diagram of apparatus for use according to the principles of the invention.

FIG. 4 shows control system 400 for controlling a self-service device such as 300 (shown in FIG. 3). System 400 is controlled by CPU 402. CPU 402 exchanges transaction information with electronic communication network N via modem 404, which is in communication with router R. CPU 402 may receive transaction information from a customer via monitor 406, keypad 408, card reader 410 and deposit acceptor 412. CPU 402 may dispense bills through bill dispenser 414. Such CPU control may extend further to include control of user asset alert conditions or any suitable alert conditions.

In certain embodiments of the invention, CPU 402 may receive transaction information, such as a PIN, from keypad 408 and/or card reader 410. In such circumstances, CPU 402 may preferably communicate such information to network N via modem 404, which is in communication with router R. Such transaction information may trigger a user asset condition alert according to the invention. The algorithms for determining threshold valuation of user asset condition alert triggers, or any other suitable alert triggers, may be stored at a mainframe computer, a central server or at any other suitable location. In certain embodiments of the invention, such algorithms may be stored, at least in part, locally at the ATM itself.

It should be noted that prior to communicating with the network via router R, CPU 402 typically verifies the PIN received from the user with a PIN offset value stored on the magnetic stripe, or other storage mechanism, on the bank card. The PIN offset value typically corresponds to the input user PIN but is "offset" by some predetermined value (or using a predetermined algorithm) in order to prevent fraudulent conversion of the PIN information in the communication channel between the ATM and the main frame computer or central server. Thus, if a third party were to obtain the account information and the bank card PIN information, the third party could not access the user account without knowing a code that the self-service device used to match the PIN and the PIN offset value.

When the self-service device matches an input PIN with a PIN, the self-service device may preferably communicate, to a self-service device operations module, that the correct PIN information had been received at the self-service device. In response to receipt of the PIN information, the module may use the information review and/or monitor the user accounts to transmit user asset condition alerts, or other suitable alerts, to the self-service device.

It should be noted that other local security alert information may also be transmitted, together with or separate from, the PIN information to the main frame computer or central server.

In other embodiments of the invention, a CPU, such as CPU 402, may be in communication with a memory (not shown) on the self-service device 400.

Figure 5:
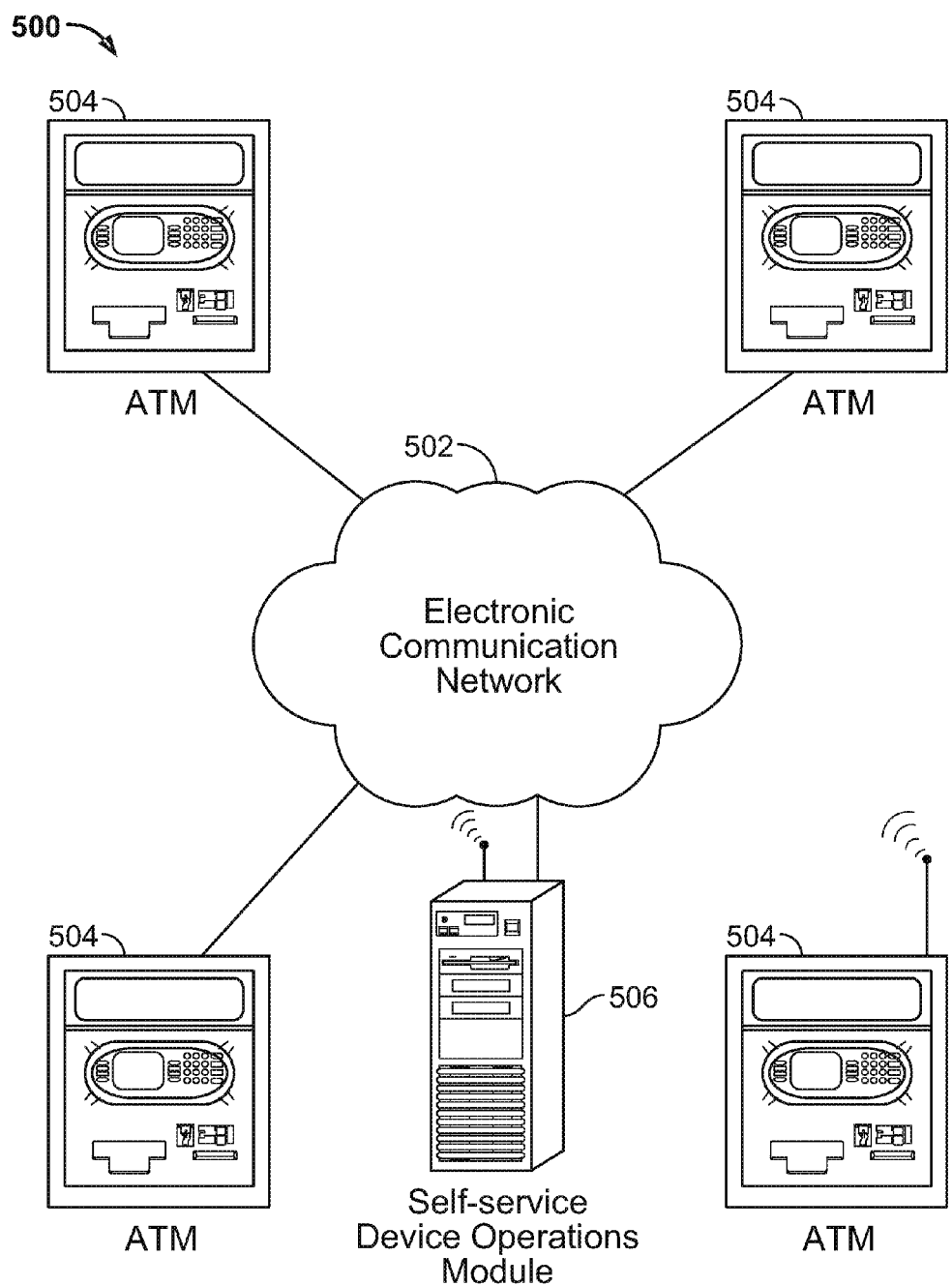
FIG. 5 shows a schematic diagram of a network for use according to the principles of the invention.

FIG. 5 shows illustrative transaction information network 500. Transaction information network 500 may include electronic communication network 502. Network 502 may be in part a LAN, WLAN or a WAN or any other suitable network. Network 502 or portions thereof may be cabled, wired, optical fibered or wireless.

Self-service devices such as ATMs 504 may communicate via electronic communication network 502 with self-service device operations module 506. Self-service device operations module 506 may include one or more devices shown in FIG. 1. A remote user may use self-service device operations module 506 to monitor, control and/or intervene in one or more processes of ATMs 504. Such actions may correspond to one or more of the embodiments described herein.

Figure 6:
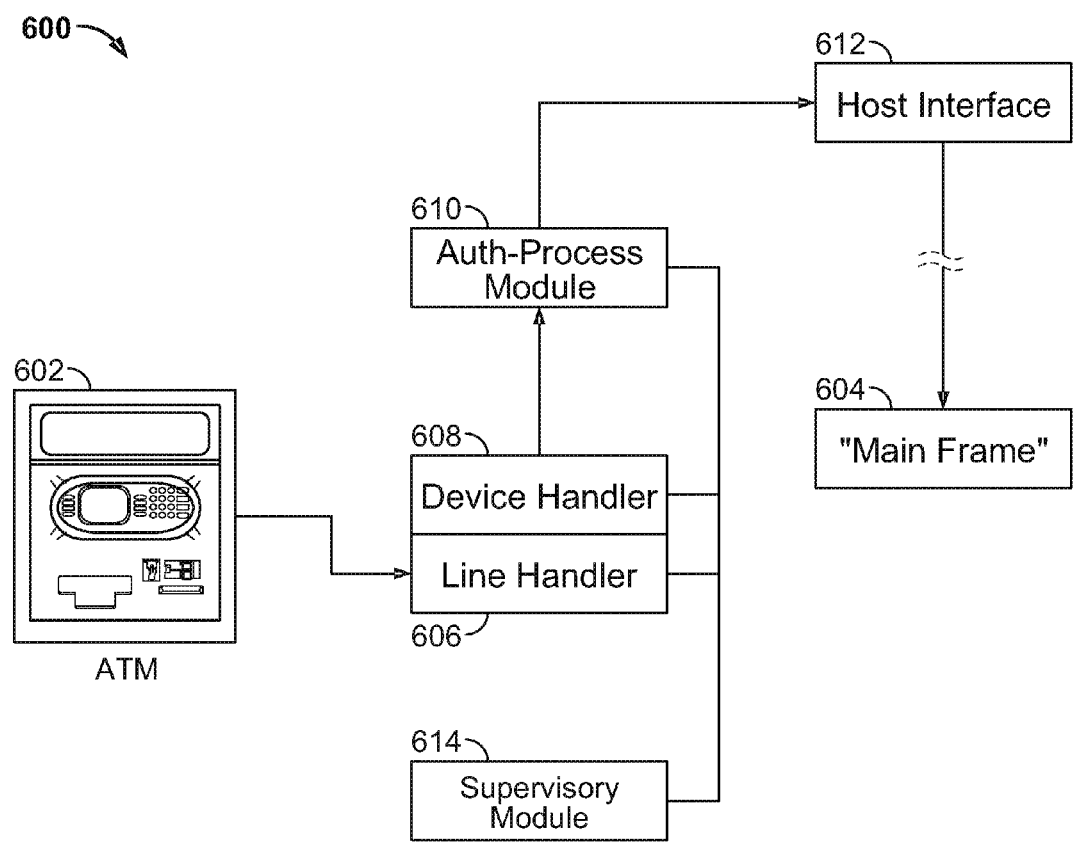
FIG. 6 shows a schematic diagram of another apparatus for use according to the principles of the invention.

FIG. 6 shows illustrative portions of communication system 600 for exchanging transaction information between ATM 602 and financial institution transactional platform 604. ATM 602 may be an ATM such as 300 (shown in FIG. 3). Transactional platform 604 may be any suitable device for settlement and clearing of transactions. For example, platform 604 may be a financial institution mainframe.

Command lines in transactional information from ATM 602 may be executed at line handler protocol layer 606. Device handler 608 may handle routing decisions based on transactional information requirements for authorization, settlement, clearance, transactional networks and issuing financial institutions.

In certain implementations according to the invention, such authorization may be transmitted together with, or separately from user asset condition alert information. Such user asset condition alert information may also be executed at line handler protocol layer 606.

Authorization requests may then be processed by auth-process module 610. Auth-process module 610 may then provide transactional information to host interface 612 for communication with platform 604.

Supervisory module 614 may receive data from line handler 606, device handler 608, auth-process module 610, or any other suitable source. The data may be used to manage ATM 602. The data may be provided to a self-service operations module such as 506 (shown in FIG. 5).

In one embodiment of the invention, supervisory module 614 may further receive data relating to user asset condition alerts. Such data may be further communicated to self-service device operations module 506 and/or one or more of ATMs 504 (shown in FIG. 5).

Apparatus and processes in accordance with the principles of the invention may include one or more features illustrated in FIGS. 7-11. For the sake of illustration, the steps of the process illustrated in FIG. 7-11 will be described as being performed by a "system." The "system" may include one or more of the features of the apparatus that are shown in FIGS. 1-6 and/or any other suitable device or approach. The "system" may be provided by an entity. The entity may be an individual, an organization or any other suitable entity.

Figure 7:
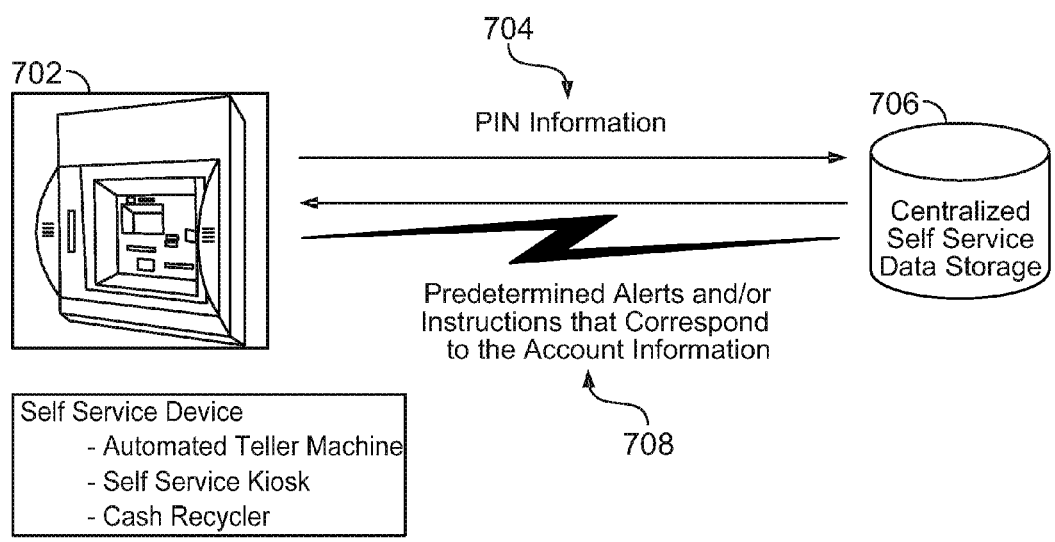
FIG. 7 shows elements of another illustrative hybrid device/process in accordance with the principles of the invention.

FIG. 7 shows elements of an illustrative hybrid device/process in accordance with the principles of the invention. FIG. 7 shows a self-service device 702. Self-service device 702 may be an ATM, a self-service kiosk, a cash recycler or another suitable self-service device (referred to collectively herein as a "self-service device").

The network accessibility 704 of device 702 preferably requires a secure network connection and further requires user authentication. Such network accessibility 704 may provide a connection to remote central self service device data storage 706.

Such accessibility, together with ATM data transmission, may preferably be used to implement embodiments of user asset condition alerts and/or any other suitable user alerts.

PIN information transferred to self-service device 706 may trigger algorithms (set forth in more detail below with respect to FIGS. 8-10) for implementation of user asset condition alerts.

Such user asset condition alerts may control the flow of information from, and the availability of menu options on, self-service device 702. Such unique alerts and/or options may preferably correspond to the user account information 708.

Figure 8:
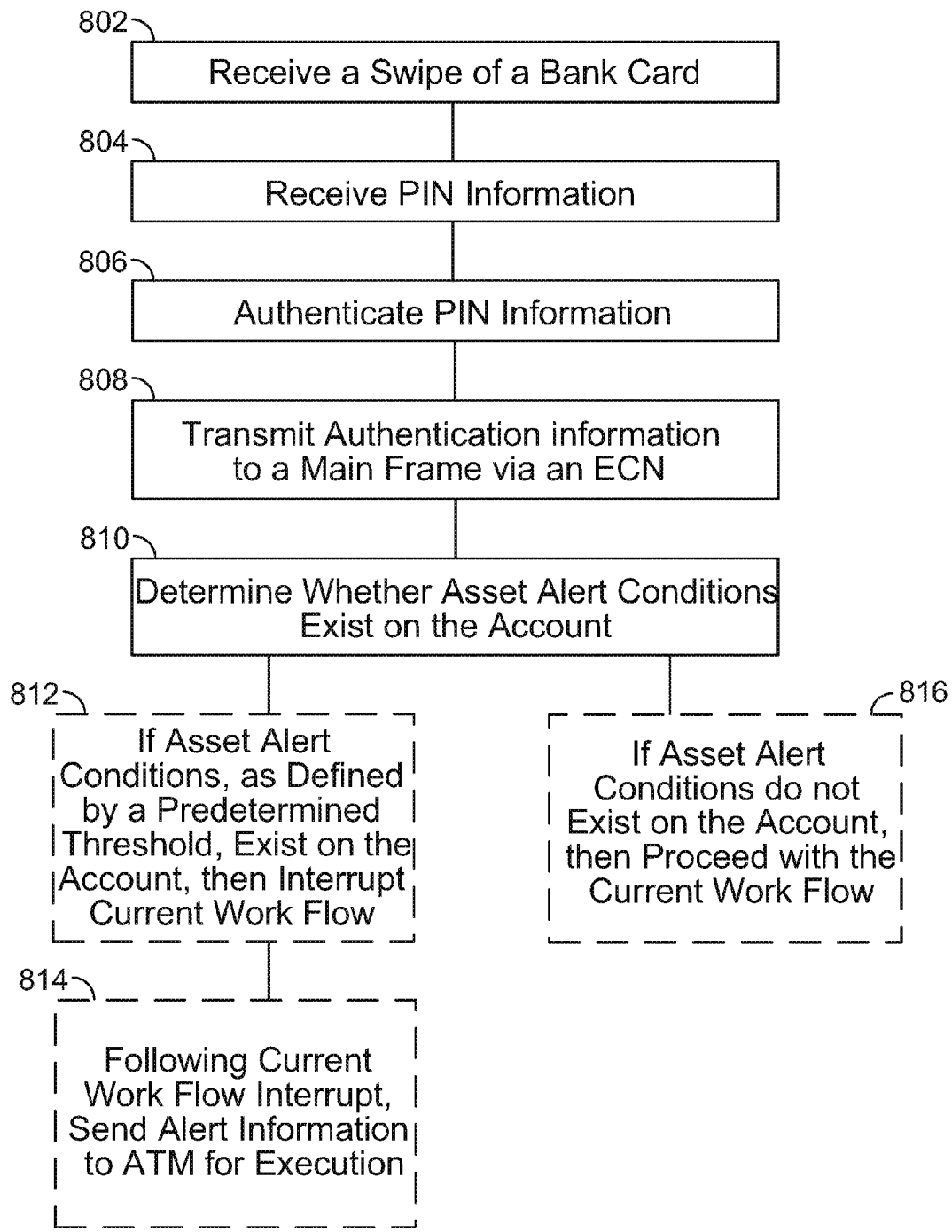
FIG. 8 shows an illustrative flow diagram that describes a method for implementing a user asset condition alert according to the invention.

FIG. 8 shows a first algorithm that may be used in implementing systems and methods according to the invention. Step 802 shows receiving a swipe of a bank card. Step 804 shows receiving PIN information. Step 806 shows authenticating PIN information and step 808 shows transmitting authentication information to a main frame computer (or other suitable computing device) via an electronic communications network ("ECN").

Step 810 shows determining whether an asset alert condition exists on the account. Step 812 shows that, if an asset alert condition, as defined by a predetermined threshold value relating to account balance or some other suitable parameter, exists on the account, then the current work flow is interrupted. At step 814, following current work flow interrupt, the main frame may send alert information to the ATM for execution—e.g., communication to the user.

Step 816 shows that, if an alert condition does not exist on the account, then the systems and methods proceed with the current work flow. The broken lines around boxes 812 and 816 signify that these steps are in the alternative—i.e., if one occurs the other does not. As such, the broken lines signify that steps encased in broken lines may or may not occur in any given flow path.

Figure 9:
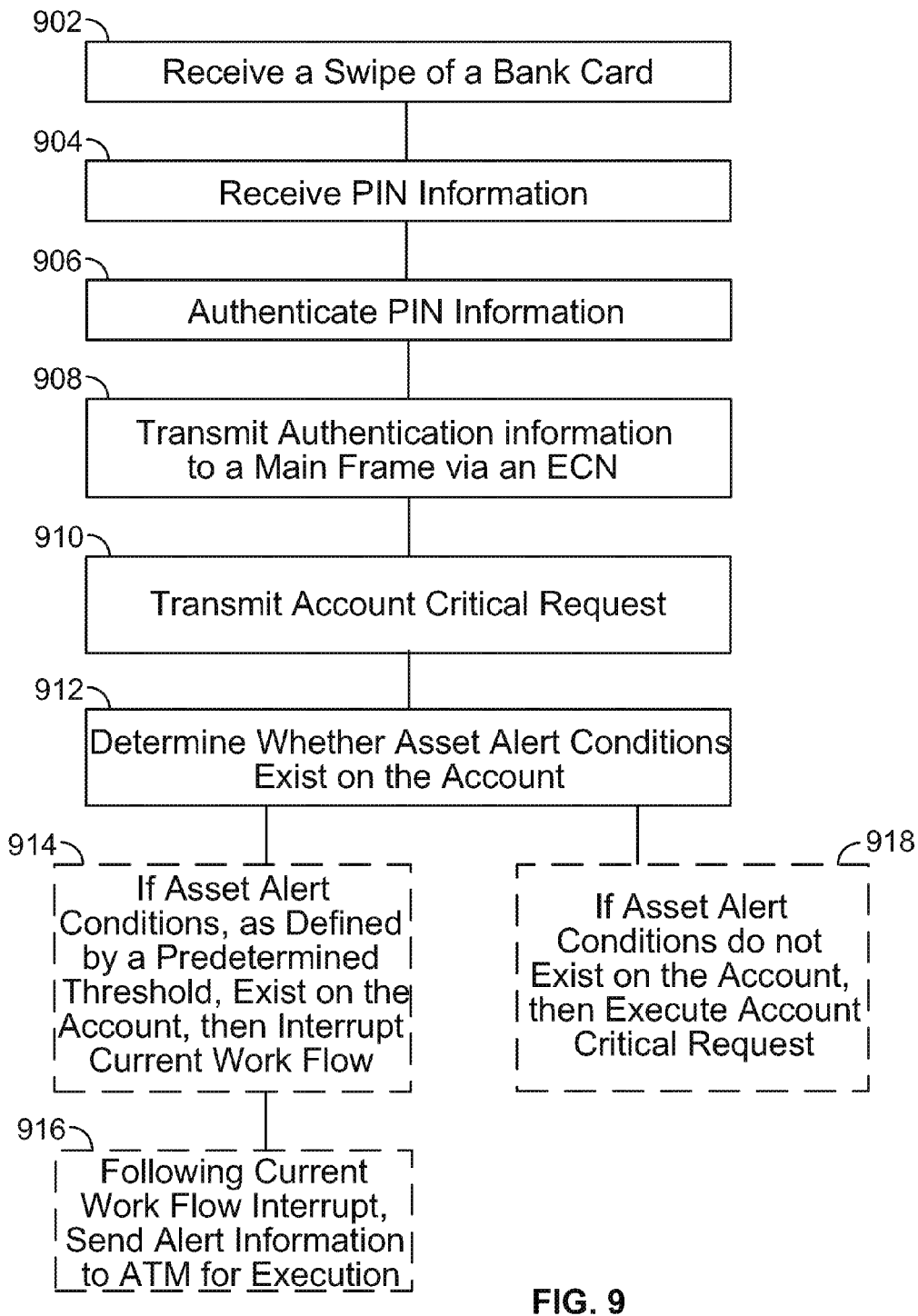
FIG. 9 shows another illustrative flow diagram that describes a method for implementing a user asset condition alert according to the invention.

FIG. 9 shows another algorithm that may be used in implementing systems and methods according to the invention. The main difference between the algorithms shown in FIGS. 8 and 9 is that FIG. 9 includes the additional step, 910, that illustrates the ATM transmitting an account critical request—e.g., a request that may affect the balance of funds in the account or some other similar request. Such a request may further include a "Fast Cash" withdrawal, a regular withdrawal or any other suitable account critical request.

Following such a request, a determination, as shown in 912, may be made whether asset alert conditions exist on the account. Steps 914 and 916 mirror steps 812 and 814 of FIG. 8. Step 918 sets forth that, if asset alert conditions do not exist on the account then the main frame may execute the previously received account critical request.

It should be noted that, following either step 816 and/or step 916, systems and methods according to the invention may evaluate the user response options to the alert conditions. Such evaluation may include reviewing user accounts to determine whether the user can ameliorate the alert conditions by, for example, moving funds from one account to another. Following such an evaluation, systems and methods according to the invention may provide options to customers on where to reallocate funds in order to respond to the alert conditions.

Figure 10:
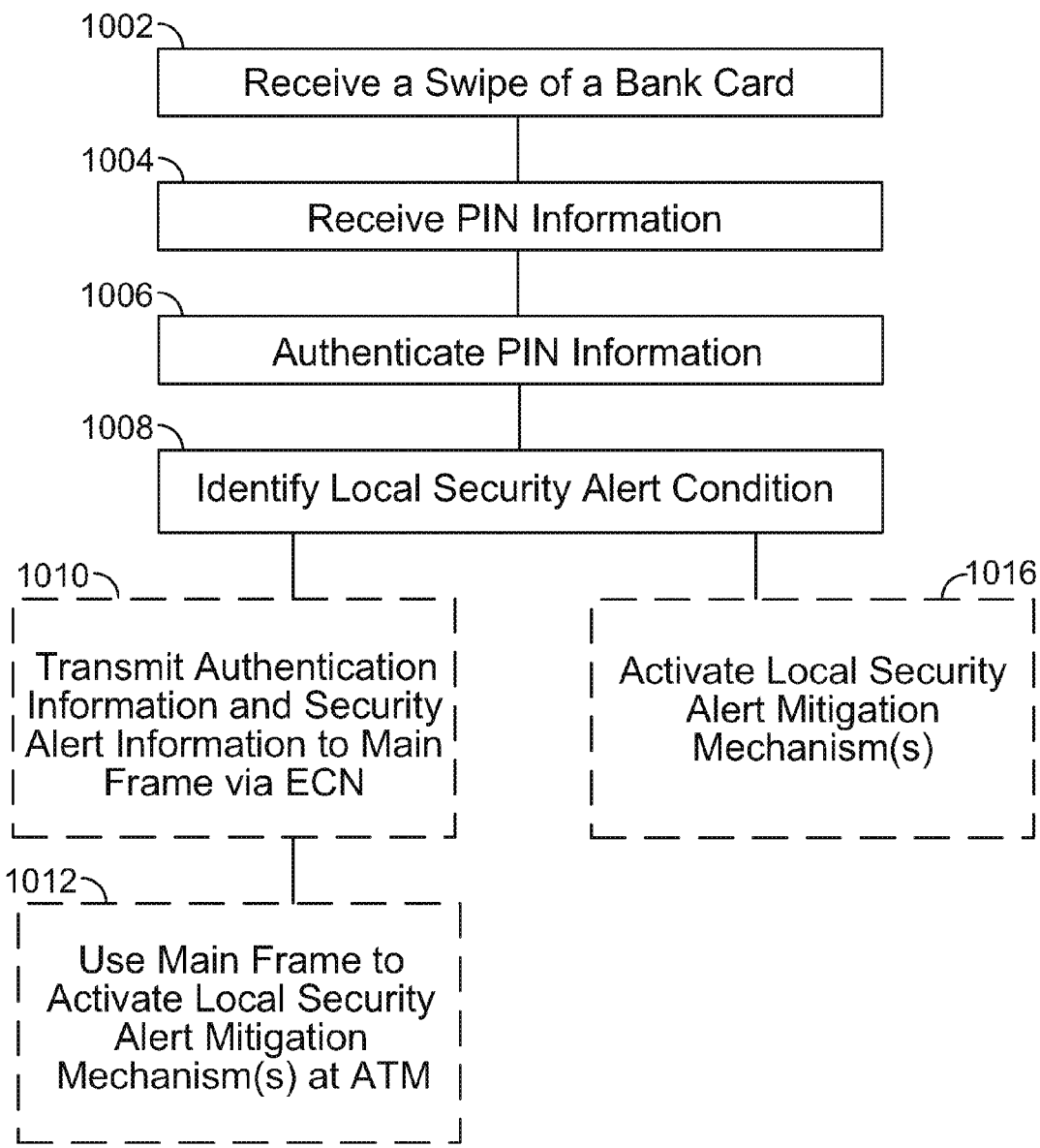
FIG. 10 shows yet another illustrative flow diagram that describes a method for implementing a user asset condition alert according to the invention.

FIG. 10 shows yet another algorithm that may be used with systems and methods according to the invention. Steps 1002, 1004 and 1006 all mirror the corresponding steps in the previously described algorithms.

Step 1008 shows the ATM identifying a localized security alert condition at the ATM. Such security alert condition may include detection of a suspicious party within a pre-determined proximity of the ATM, or other similar security alert condition.

Step 1010 shows that, in one embodiment of the algorithm shown in FIG. 10, the ATM may transmit authentication information together with, or separate from, security alert information, to the main frame computer via the ECN. It should be noted that when the authentication information is transmitted to the main frame computer separate from the security alert information, the authentication information may be transmitted before, substantially simultaneously to, or after the security alert information. In certain embodiments where security information may be transmitted to the main frame computer before the transmission of the authentication information, some or all of the security information may be transmitted even prior to the establishing of authentication criteria associated with the PIN input by the user. In such embodiments, the relative speed of responses to the security alert conditions may be increased.

Step 1012 shows that the main frame may be used to activate local (to the ATM) security alert mitigation mechanism(s). Such alert mitigation mechanism(s) may be as set forth in the following table.

TABLE 4

Local (to ATM) Security Alert Mitigation Mechanisms

Disabling of ATM Cash Dispenser (See item 310 in FIG. 3)
Disable ATM
Sound Local ATM Alarm
Increase Surveillance
Alert Appropriate Security Authorities
Combination of one or more of the foregoing Step 1016 shows that systems and methods according to the invention may, alternative to or in concert with steps 1010 and 1012, activate local security alert mitigation mechanism(s) at or near the ATM.

FIG. 11 is an illustrative flow diagram that describes a method for implementing a security condition alert according to the invention. Step 1102 shows using motion sensor technology to determine a threshold level of proximity of a suspicious person. Such threshold levels may be determined based on forensic studies of trespass and/or theft associated with ATM machines. For example, a particular suspicious person may remain at a particular distance from an ATM for a certain number of users' sessions in order to determine the PIN number of a user and/or the amount of money withdrawn by a user. Such behavior may trigger one or more of the above-described security alert mitigation mechanisms. Further, motion sensor technology may be replaced or combined with any suitable technology to determine a threshold level of proximity of a suspicious person.

Step 1104 shows that a security condition alert may also be generated if a threshold detection of tampering with ATM has been detected.

Step 1106 shows that a security condition alert may also be generated if a threshold level of users are waiting for the ATM and/or atypical behavior (such as behavior that fits a predetermined "suspicious person" paradigm) is exhibited by one or more of the users waiting on line to use the ATM.

Step 1108 shows that a security condition alert may be generated if a threshold detection of recent fraudulent use of the ATM has been exceeded.

In response to one or more of the foregoing determinations, methods according to the invention may proceed along at least one of two paths. The methods may either transmit authentication information and security alert information to a Main Frame computer via an ECN, as shown in step 1110, and/or the method may activate security alert mitigation mechanism(s) local to the ATM, as shown in 1116. Following step 1110, the main frame may activate local security alert mitigation mechanism(s) at the ATM, as per step 1112, or, in the alternative, send instructions to activate local security alert mitigation mechanism(s) at the ATM, as per step 1116.

In yet other embodiments of the invention, if a user was away from his or her home region, the system may generate alerts that correspond to the user's remote status—i.e., the ATM may flag the other user accounts to indicate that the financial user is remote from his home location. For example, remote ATM authentication by a user may notify the user credit card account that the user is remote and, based on the location of the user, the credit card account may allow the user to perform certain high risk activities even though the user is not in his home region.

One of ordinary skill in the art will appreciate that the elements shown and described herein may be performed in other than the recited order and that one or more elements illustrated may be optional. The methods of the above-referenced embodiments may involve the use of any suitable elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, a self-service terminal with mechanism(s) for making deposits and for permitting withdrawals as well as methods for alerting a user regarding an alert condition have been provided. Persons skilled in the art will appreciate that the present invention can be practiced by other than the described embodiments, which are presented for purposes of illustration rather than of limitation. The present invention is limited only by the claims that follow.

What is claimed is:

1. A central computing system comprising:
a receiver module configured to receive from a self-service device a notification that a self-device user is authorized to access an account, the notification following a determination by the self-service device that the user is authorized to access the account;
a processor module in communication with the receiver module and configured to determine, in response to receiving from the self-service device the notification that the user is authorized to access the account, and prior to user selection of a transaction, whether a predetermined asset alert condition exists that corresponds to the account, wherein the asset alert condition comprises an account overdraft or a low account balance;
a transmitter module;
wherein:
when the predetermined asset alert condition exists:
the transmitter module is configured to transmit an alert notification to the self-service device for presentation to the user;
the processor module is further configured to evaluate user options to ameliorate the asset alert condition; and
the transmitter module is further configured to transmit to the self-service device one or more user options to ameliorate the asset alert condition for presentation to the user; and
when the predetermined asset alert condition does not exist, the transmitter module is configured to authorize access to an account in response to the authorization notification.

2. The system of claim 1, wherein the alert notification is configured to display a visual alert to a user at the self-service device.

3. The system of claim 1, wherein the alert notification is configured to implement a tactile alert to a user at the self-service device.

4. The system of claim 1, wherein the alert notification is configured to sound an audio alert to a user at the self-service device.

5. The system of claim 1, wherein the alert notification is configured to display a visual alert, sound an audio alert and implement a tactile alert to a user at the self-service device.

6. The system of claim 1, wherein when the predetermined asset alert condition exists the processor module is further configured to interrupt a current work flow of the self-service device prior to the transmitter module transmitting an alert notification to the self-service device.

7. The system of claim 1, wherein, when the predetermined asset alert condition exists, the processor module is further configured to interrupt a current work flow of the self-service device substantially simultaneous with the transmitter module transmitting an alert notification to the self-service device.

8. The system of claim 1, wherein, when the predetermined asset alert condition exists, the processor module is further configured to interrupt a current work flow of the self-service device after the transmitter module has completed transmitting an alert notification to the self-service device.

9. One or more non-transitory computer-readable media storing computer-executable instructions which, when executed by a processor on a computer system, perform a method for alerting a self-service device user to an asset condition alert, the method comprising:

using a receiver module to receive from a self-service device a notification that account use has been authorized for a self-service device user, the notification following a determination of account use authorization by the self-service device;

in response to receiving from the self-service device the notification that the account use has been authorized, and prior to user entry of information regarding a transaction, using a processor module to determine whether a predetermined asset alert condition exists that corresponds to the account, wherein the asset alert condition comprises an account overdraft or low account balance;

when the predetermined asset alert condition exists:
using a transmitter module to transmit an alert notification to the self-service device for presentation to the user;
using the processor module to evaluate user options to ameliorate the existing asset alert condition; and
using the transmitter module to transmit to the self-service device one or more user options to ameliorate the asset alert condition for presentation to the user; and when the predetermined asset alert condition does not exist, using the transmitter module to authorize use of an account in response to the notification that account use has been authorized.

10. The method of claim 9, further comprising displaying a visual alert to a user at the self-service device.

11. The method of claim 9, further comprising implementing a tactile alert for sensory detection by a user at the self-service device.

12. The method of claim 9, further comprising sounding an audio alert at the self-service device.

13. The method of claim 9, further comprising displaying a visual alert, sounding an audio alert and implementing a tactile alert for sensory detection by a user at the self-service device.

14. The method of claim 9, further comprising, when the predetermined asset alert condition exists, using the processor module to interrupt a current work flow of the self-service device prior to the transmitter module transmitting an alert notification to the self-service device.

15. The method of claim 9, further comprising, when the predetermined asset alert condition exists, using the processor module to interrupt a current work flow of the self-service device substantially simultaneously with using the transmitter module to transmit an alert notification to the self-service device.

16. The method of claim 9, further comprising, when the predetermined asset alert condition exists, using the processor module to interrupt a current work flow of the self-service device after the transmitter module has completed transmitting an alert notification to the self-service device.

17. A self-service device comprising:
a receiver module configured to receive an input from a user, the input including information corresponding to a request for account access authorization;
a processor module in communication with the receiver module and configured to authorize account access based on the received input; and
a transmitter module configured to transmit a notification authorizing account access to a central computing system;
wherein:
prior to a user entry of information regarding a transaction, the processor module is further configured to interrupt a current work flow of the self-service device; and
when a predetermined asset alert condition exists, the receiver module is configured to receive from the central computing system:
an asset alert condition alert notification, wherein the asset alert condition comprises an account overdraft or low account balance; and
one or more user options to ameliorate the existing asset alert condition for presentation to the user; and
when the predetermined asset alert condition does not exist, the processor module is configured to authorize use of an account in response to the notification authorizing account access.

18. The device of claim 17 wherein the alert notification comprises displaying a visual alert to a user at the self-service device.

19. The device of claim 17, wherein the alert notification comprises implementing a tactile alert to a user at the self-service device.

20. The device of claim 17, wherein the alert notification comprises sounding an audio alert at the self-service device.

21. The device of claim 17, wherein the alert notification comprises displaying a visual alert and implementing a tactile alert to a user at the self-service device.

22. The device of claim 17, wherein, when the predetermined asset alert condition exists, the processor module is further configured to interrupt a current work flow of the self-service device prior to the receiver module receiving an alert notification from the central computing system.

23. The device of claim 17, wherein, when the predetermined asset alert condition exists, the processor module is further configured to interrupt a current work flow of the self-service device substantially simultaneous with the receiving module receiving an alert notification from the central computing system.

24. The device of claim 17, wherein, when the predetermined asset alert condition exists, the processor module is further configured to interrupt a current work flow of the self-service device after the receiver module has completed receiving an alert notification from the central computing system.

* * * * *